(12) United States Patent
Weh et al.

(10) Patent No.: US 10,730,493 B2
(45) Date of Patent: Aug. 4, 2020

(54) HYDRAULIC BLOCK AND MANUFACTURING METHOD FOR A HYDRAULIC BLOCK INCLUDING AT LEAST ONE CHECK VALVE

(71) Applicant: Robert Bosch GmbH, Stuttgart (DE)

(72) Inventors: Andreas Weh, Sulzberg (DE); Harald Guggenmos, Immenstadt/Seifen (DE)

(73) Assignee: Robert Bosch GmbH, Stuttgart (DE)

(*) Notice: Subject to any disclaimer, the term of this patent is extended or adjusted under 35 U.S.C. 154(b) by 38 days.

(21) Appl. No.: 16/090,507

(22) PCT Filed: Feb. 23, 2017

(86) PCT No.: PCT/EP2017/054102
§ 371 (c)(1),
(2) Date: Oct. 1, 2018

(87) PCT Pub. No.: WO2017/182174
PCT Pub. Date: Oct. 26, 2017

(65) Prior Publication Data
US 2019/0111903 A1    Apr. 18, 2019

(30) Foreign Application Priority Data
Apr. 21, 2016    (DE) .................. 10 2016 206 785

(51) Int. Cl.
*B60T 8/34*     (2006.01)
*B60T 8/36*     (2006.01)
(Continued)

(52) U.S. Cl.
CPC .............. *B60T 8/341* (2013.01); *B60T 8/368* (2013.01); *B60T 7/042* (2013.01); *B60T 8/4081* (2013.01)

(58) Field of Classification Search
CPC .......... B60T 8/3675; B60T 8/368; B60T 8/34; B60T 8/341; F16K 15/044
See application file for complete search history.

(56) References Cited

U.S. PATENT DOCUMENTS 2,415,245 A    2/1947  Hopmans
5,213,586 A *  5/1993  Welker ................. C10L 3/006
                                                 137/202
(Continued)

FOREIGN PATENT DOCUMENTS

DE    102014215311 A1    2/2016
EP       0033010 A1    8/1981
(Continued)

OTHER PUBLICATIONS

International Search Report for PCT/EP2017/054102, dated Apr. 28, 2017.

*Primary Examiner* — Nicholas J Lane
(74) *Attorney, Agent, or Firm* — Norton Rose Fulbright US LLP; Gerard Messina (57) ABSTRACT

A hydraulic block is described for a braking system of a vehicle including at least one check valve, which is situated in a check valve receiving bore extending partially through the hydraulic block, including a valve seat and a valve body, the check valve receiving bore being formed as a stepped recess into the hydraulic block including a first subarea having at least one minimum diameter and an inner second subarea having at most one maximum diameter smaller than the minimum diameter; the valve seat is inserted onto and/or into the check valve receiving bore in a direct contact with at least one inner wall of the check valve receiving bore; and the valve body being inserted cageless and adjustable within the first subarea of the check valve receiving bore. A braking system for a vehicle and a manufacturing method for a (Continued)

hydraulic block for a braking system of a vehicle including at least one check valve are also described.

12 Claims, 6 Drawing Sheets

(51) Int. Cl.
  *B60T 8/40* (2006.01)
  *B60T 7/04* (2006.01)

(56) References Cited

U.S. PATENT DOCUMENTS

| | | | |
|---|---|---|---|
| 5,993,179 A * | 11/1999 | Baur | B60T 8/4031 |
| | | | 417/554 |
| 6,206,486 B1 | 3/2001 | Sakai et al. | |
| RE37,322 E * | 8/2001 | Scott | F16K 15/02 |
| | | | 137/533.21 |
| 2009/0242049 A1 | 10/2009 | Yamashita et al. | |
| 2010/0244552 A1 * | 9/2010 | Weh | B60T 8/2475 |
| | | | 303/116.1 |

FOREIGN PATENT DOCUMENTS

| | | |
|---|---|---|
| EP | 1759947 A2 | 3/2007 |
| JP | 2001263560 A | 9/2001 |

\* cited by examiner

HYDRAULIC BLOCK AND MANUFACTURING METHOD FOR A HYDRAULIC BLOCK INCLUDING AT LEAST ONE CHECK VALVE

FIELD OF THE INVENTION

The present invention relates to a hydraulic block for a braking system of a vehicle and a braking system for a vehicle. The present invention also relates to a manufacturing method for a hydraulic block for a braking system of a motor vehicle having at least one check valve.

BACKGROUND INFORMATION

A braking system for a vehicle, which is equipped with a motorized piston-cylinder device for autonomous brake pressure buildup, is described in German Published Patent Application No. 10 2014 215 311. During the autonomous brake pressure buildup, a standard pedal feeling is able to be ensured for a driver actuating a brake pedal of the braking system with the aid of at least one simulator device. Both the at least one simulator device of the braking system and the motorized piston-cylinder device are each connected via a check valve to a brake fluid reservoir of the braking system.

SUMMARY

The present invention provides a hydraulic block for a braking system of a vehicle, a braking system for a vehicle, and a manufacturing method for a hydraulic block for a braking system of a vehicle including at least one check valve.

The present invention provides cost-effective hydraulic blocks each including at least one function-optimized check valve. Due to the direct attachment of the valve seat in the check valve receiving bore, which is formed as a stepped recess in the particular hydraulic block, a subassembly is not required to form the at least one check valve. Instead, the valve seat and the valve body of each check valve are/will be installed directly in the associated check valve receiving bore/the hydraulic block. A number of conventional check valve components which induce turbulences is reduced with the aid of the omission of the subassembly. In particular, it is ensured that the desired volume flow through the particular check valve (for example, for the aspiration/subsequent snifting of volume from a brake fluid reservoir) is not obstructed by a cage. As a result of the stepped design of the check valve receiving bore, a flow-optimized lift limitation in the at least one check valve is additionally achieved.

In one advantageous specific embodiment of the hydraulic block, the valve body is formed rotation-symmetrically having a rounded side oriented toward the valve seat. The rotation-symmetrical formation of the valve body prevents the occurrence of turbulences as brake fluid (or hydraulic fluid) flows through the particular check valve in the predefined flow-through direction. At the same time, it is ensured that the rounded side may form a fluid-tight contact with a seal area of the valve seat when the valve body is pressed against the valve seat and in this way brake fluid is prevented from flowing through the particular check valve in a closing direction opposite to the flow-through direction. The valve seat may be fastened using a so-called self-clinch connection in the hydraulic block.

A valve area of the valve body, which has a rounded side oriented toward the valve seat, is preferably formed from a first material having a first mechanical resistance, and a remainder of the valve body is formed from a second material having a second mechanical resistance less than the first mechanical resistance. The valve area of the valve body, which contacts the seal area of the valve seat and is made of the first material, thus has an advantageously high strength. This ensures the desired liquid-tight contact between the valve body and the seal area, if the valve body is pressed against the valve seat.

In addition, it is advantageous if the valve body includes an intermediate portion or end portion in the form of a cone or truncated cone. A shape of the valve body may be described in this case as drop-shaped or drop-like. The drop-shaped or drop-like shape of the valve body prevents turbulences or a stall during flow through the particular check valve in the predefined flow-through direction. A reduced volume throughput therefore does not have to be accepted during the flow through the particular check valves in the predefined flow-through direction.

Moreover, guide projections, which protrude into guide tracks in the at least one inner wall of the check valve receiving bore, may be formed on a side of the valve body facing away from the valve seat. In spite of the cageless arrangement of the valve body in the check valve receiving bore, the valve body may therefore be guided inside the first subarea of the check valve receiving bore.

For example, the check valve receiving bore is formed on a reservoir side of the hydraulic block, on which a brake fluid reservoir is installable or installed. The good ability to flow through the particular check valve in its predefined flow-through direction may therefore advantageously be used for the aspiration/subsequent snifting of brake fluid from the brake fluid reservoir.

In particular, a plunger receiving bore may be formed in the hydraulic block and the check valve receiving bore may be hydraulically connected to the plunger receiving bore (using a direct borehole).

The flow-optimized design of the check valve formed in the check valve receiving bore may therefore be used for a variety of processes which are carried out with the aid of a plunger device provided in the plunger receiving bore.

In one advantageous specific embodiment of the hydraulic block, the check valve is designed to be springless. A volume flow flowing through the check valve in its predefined flow-through direction is therefore not obstructed by a check valve spring.

A quotient of a total weight of the valve body and a total volume of the valve body is preferably less than a density of brake fluid or water. In this case, the valve body is designed as a float valve. This reduces a lift of the valve body (for the liquid-tight sealing of the check valve) and ensures an automatic escape of air in case of an air pocket in a volume hydraulically connected to the check valve receiving bore.

For example, the valve body may enclose an inner cavity, which is filled with air, has a low pressure, and/or has a vacuum, completely and in a liquid-tight manner. Therefore, even a cost-effective valve body may have the advantageous quotient of its total weight and its total volume being less than the density of brake fluid or water.

In a further advantageous specific embodiment, a spring of the check valve is anchored directly on the valve body. Turbulences during flow through the particular check valve in its predefined flow-through direction may also be prevented with the aid of such a design of the spring.

A support shoulder for the spring may also be formed on the valve body. (The end stop of the valve body lies in the borehole, however.)

The valve seat preferably has a cutting edge, and the at least one material of the hydraulic block is softer than the at least one material of the valve seat and is formed as a result of its contact with the cutting edge of the valve seat. This ensures a form-fit tight connection between the valve seat and the hydraulic block after an easily executable installation of the valve seat.

The above-described advantages are also ensured in a braking system for a vehicle including such a hydraulic block.

Furthermore, the above-described advantages are also implementable by carrying out a corresponding manufacturing method for a hydraulic block for a braking system of a vehicle including at least one check valve. It is to be noted that the manufacturing method is refinable according to the above-described specific embodiments of the hydraulic block.

In one advantageous specific embodiment of the manufacturing method, before the introduction of the valve body and the fastening of the valve seat, the valve body is suctioned against the valve seat with the aid of a stamp, a leak-tightness of a contact between the valve body and the valve seat being checked at the same time. A presence of a flaw on the valve body or on the valve seat which prevents the desired liquid-tight contact between the valve body and the valve seat may thus be detected early and with the aid of a method step which is executable cost-effectively.

DETAILED DESCRIPTION

Figure 1:
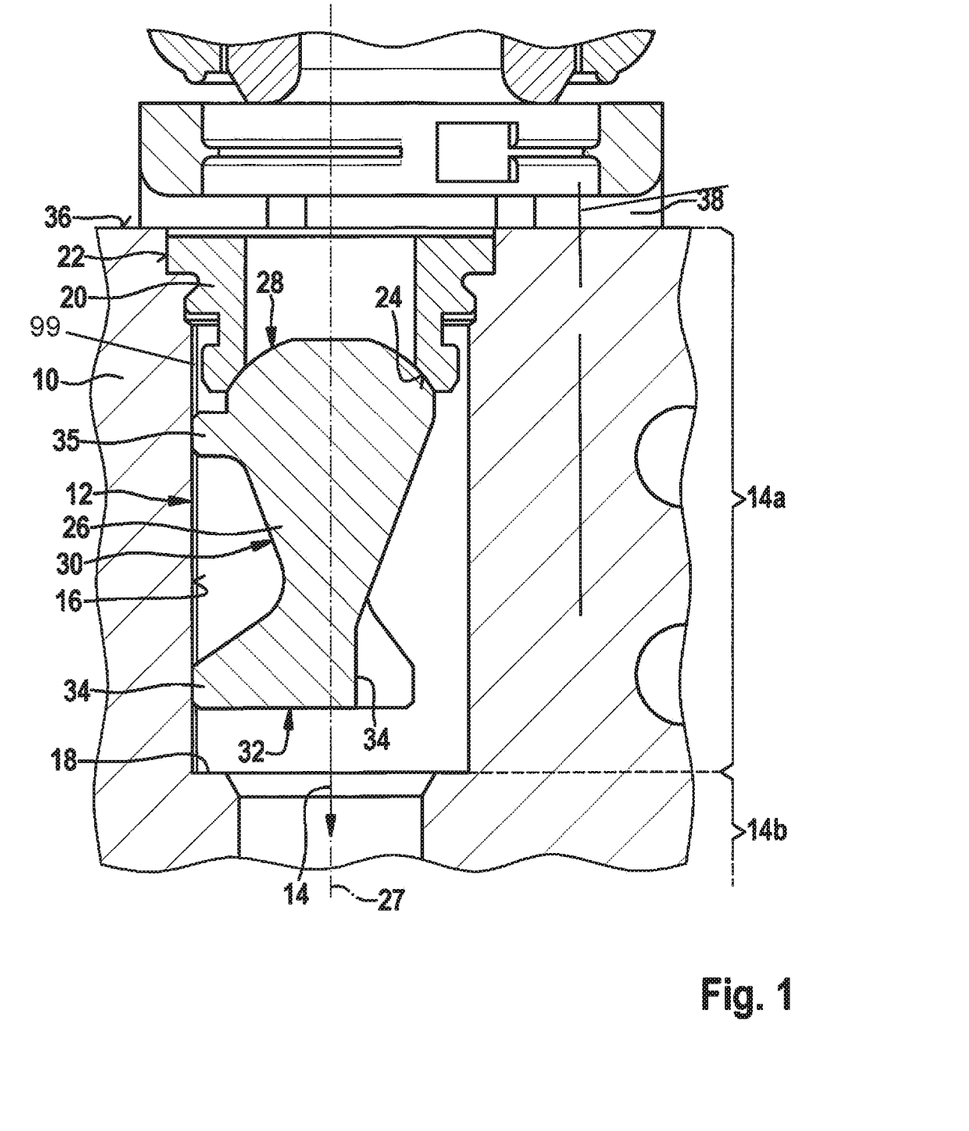
FIG. 1 shows a schematic partial view of a first specific embodiment of the hydraulic block.

FIG. 1 shows a schematic partial view of a first specific embodiment of the hydraulic block.

Hydraulic block 10, which is partially shown schematically in FIG. 1, is formed from at least one metal (for example, aluminum) and/or at least one plastic. Hydraulic block 10 is preferably a cast part or an injection-molded part, or an extrusion with subsequent mechanical machining. It is to be noted that an ability to form hydraulic block 10 is not restricted to the use of a specific material for this purpose.

Hydraulic block 10 includes at least one check valve 12, which is situated in a check valve receiving bore 14 extending partially through hydraulic block 10. Check valve receiving bore 14 is formed as a stepped recess in hydraulic block 10. The forming of check valve receiving bore 14 in hydraulic block 10 is to be understood to mean that check valve receiving bore 14 is not an opening of an insert part inserted into hydraulic block 10. Instead, at least one inner wall 16 of check valve receiving bore 14 is a boundary surface of hydraulic block 10, in particular a drilled, machined, cast, or injection-molded boundary surface of hydraulic block 10. Check valve receiving bore 14 may be drilled/machined into hydraulic block 10, so that drilling tool traces or cutting tool traces may in particular still be present on the at least one inner wall 16 of check valve receiving bore 14. Alternatively, check valve receiving bore 14 may also be formed with the aid of a projection in a cast part during the casting/injection-molding of hydraulic block 10, so that the at least one inner wall 16 of check valve receiving bore 14 may also have curing traces or imprint traces of the cast part.

Check valve receiving bore 14 has, as a stepped recess, a first subarea 14a having at least one minimum diameter and an inner second subarea 14b having at most one maximum diameter smaller than the minimum diameter. Check valve receiving bore 14 is therefore a stepped recess which tapers (from the outside to the inside). In particular, a (rotation-symmetrical) step 18 may be formed between first subarea 14a and second subarea 14b.

Check valve 12 includes a permanently situated valve seat 20 protruding at least partially into check valve receiving bore 14. Valve seat 20 is preferably made of metal or steel. Valve seat 20 is inserted onto and/or into check valve receiving bore 14 in direct contact with the at least one inner wall 16 of check valve receiving bore 14. Valve seat 20 may in particular be pressed into at least one surface 22 of hydraulic block 10 contacting valve seat 20. The at least one surface 22 of hydraulic block 10 contacting valve seat 20 may therefore have press-fit traces (or corresponding deformation traces). Moreover, valve seat 20 may be deformed by a pressure against the at least one surface 22 of hydraulic block 10 in such a way that the at least one surface 22 is partially shaped by a material of valve seat 20. An advantageous leak-tightness/liquid-tightness between hydraulic block 10 and valve seat 20 is achieved with the aid of the shaping of the at least one surface 22 directly contacting valve seat 20. The at least one surface 22 of hydraulic block 10 contacting valve seat 20 is preferably located at an outer end of check valve receiving bore 14.

Valve seat 20 may be designed including a cutting edge. A (conical) seal area/seal seat 24, against which a valve body 26 of check valve 12 may rest, is located centrally on valve seat 20. Valve body 26 is adjustably situated inside first subarea 14a of check valve receiving bore 14. This has the effect that check valve 12 may have flow through it in a direction from valve seat 20 into second subarea 14b of check valve receiving bore 14 (the so-called flow-through direction, stream-through direction, passage direction, or suction direction), while a liquid flow through check valve 12 is suppressed in a direction opposite to the flow-through direction (the so-called closing direction or blocking direction) with the aid of the liquid-tight contact of valve body 26 on valve seat 20.

Moreover, the arrangement of valve body 26 inside first subarea 14a is cage-free. This is to be understood to mean that check valve 12 does not have a conventional cage for guiding valve body 26. Instead, valve body 26 is designed in such a way that it may be guided with the aid of direct contact between at least one surface of valve body 26 and the at least one inner wall 16 of check valve receiving bore 14.

Check valve 12 shown in FIG. 1 is designed to be springless. Check valve 12 advantageously includes only valve body 26 and valve seat 20. Turbulences, as are conventionally triggered by additional check valve components (for example, a cage or a spring) are thus (nearly) suppressed during operation of check valve 12. In spite of the omission of a spring, check valve 12 moreover has a comparatively rapid closing behavior. In addition, with the aid of the stepped design of check valve receiving bore 14, a lift limitation is provided by the maximum diameter of second subarea 14b of check valve receiving bore 14 being less than a diameter of valve body 20 perpendicular to the flow-through direction of check valve 12 at an end of valve body 20 facing away from valve seat 20. (Relocating of valve body 26 into second subarea 14b is thus reliably prevented.) A lift of check valve 14 is therefore limited to at most a height of first subarea 14a of check valve receiving bore 14 (along the flow-through direction). Since check valve 12 is thus closable liquid-tight by at most the structurally predefined lift by an adjustment of valve body 26 in the closing direction, a response behavior of a braking system equipped with check valve 12 is not/marginally restricted.

In the specific embodiment of FIG. 1, valve body 26 is designed to be rotation-symmetrical. A shape of valve body 26 is thus flow-optimized. With the aid of a rotation-symmetrical design of entire check valve 12 with respect to a rotation axis of symmetry 27, its design may additionally be flow-optimized.

Valve body 26 is preferably manufactured from at least one plastic.

Valve body 26 is advantageously also designed including a rounded side 28 oriented toward valve seat 20. This yields the effect that check valve 12 is sealable liquid-tight with the aid of a contact between valve body 26 and valve seat 20 (especially seal area 24). Moreover, valve body 26 has an intermediate portion 30 in the form of a truncated cone. The shape of valve body 26 may therefore be described as drop-shaped or drop-like. This drop shape or drop-like shape of valve body 26 is flow-optimized with respect to a liquid flow through check valve 12 in its predefined flow-through direction. A comparatively large amount of brake fluid may thus flow in the shortest possible time along the predefined flow-through direction through check valve 12.

By way of example, valve body 26 shown in FIG. 1 has guide projections 34, which protrude into guide tracks 99 in the at least one inner wall 16 of check valve receiving bore 14, on a side 32 of valve body 26 facing away from valve seat 20. Reliable guiding of valve body 26 in first subarea 14 is therefore ensured in such a way that valve body 26 adjusted in the closing direction intentionally strikes on seal area 24 of valve seat 20. The valve body optionally has further guide projections 35, which also protrude into guide tracks in the at least one inner wall 16 of check valve receiving bore 14, on a part of intermediate portion 30 adjacent to rounded side 28.

In the specific embodiment of FIG. 1, check valve receiving bore 14 is formed on a reservoir side 36 of hydraulic block 10, on which a brake fluid reservoir 38 is installable or installed. Check valve 12 may therefore advantageously be used for controlling a brake fluid transfer between brake fluid reservoir 38 and the braking system equipped with check valve 12. The advantages of check valve 12 thus provided will be described in greater detail hereafter.

Figure 2:
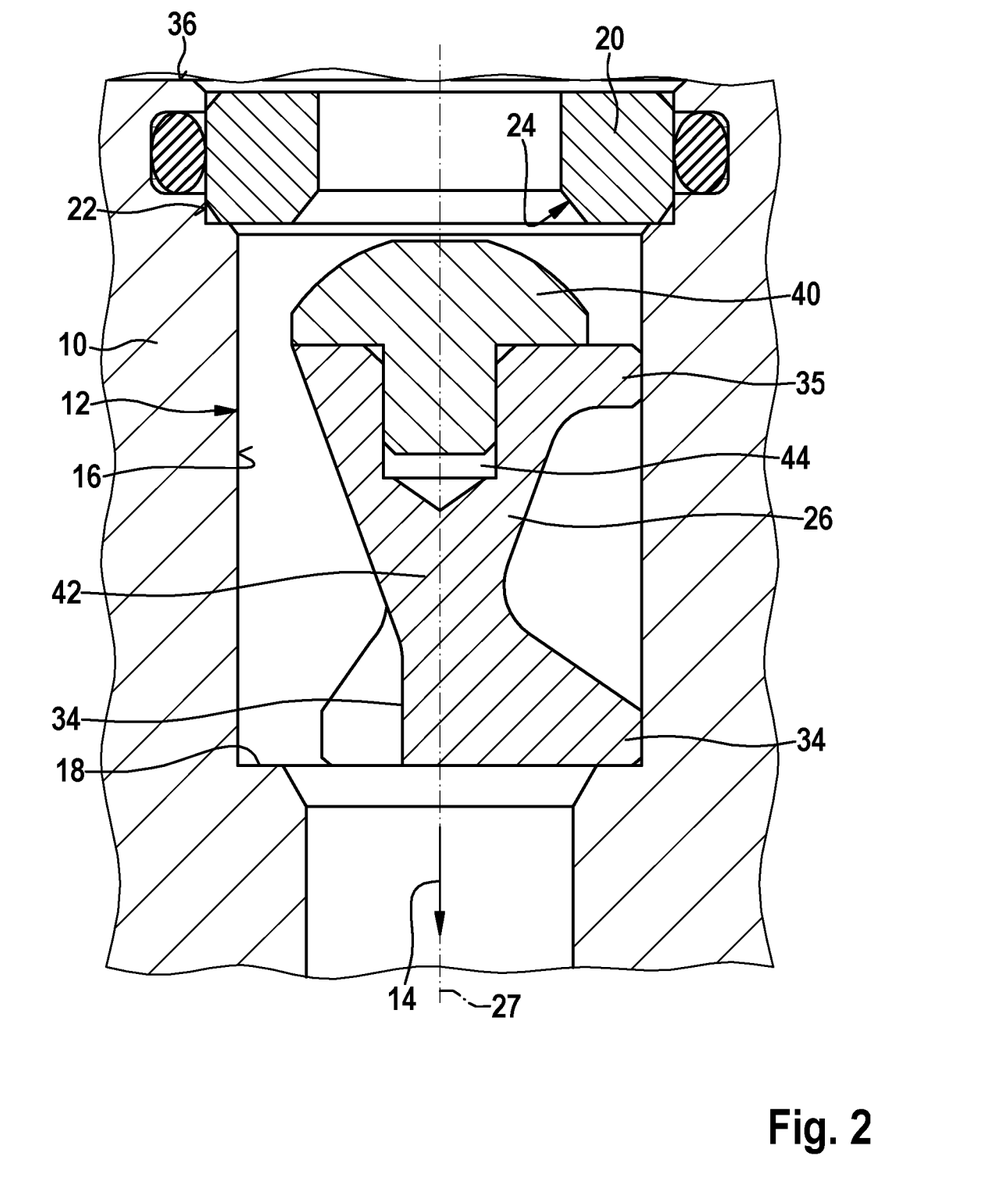
FIG. 2 shows a schematic partial view of a second specific embodiment of the hydraulic block.

FIG. 2 shows a schematic partial view of a second specific embodiment of the hydraulic block.

Hydraulic block 10 which is partially schematically shown in FIG. 2 also includes a springless and cageless check valve 12. Lift limitation of valve body 26 is again achieved with the aid of the formation of step 18 on check valve receiving bore 14, which is designed as a stepped borehole. Check valve receiving bore 14 is also flow-optimized in this case as a result of the rotation-symmetrical shape of step 18.

In contrast to the above-described specific embodiment, valve body 26 of FIG. 2 is designed as a float valve. For this purpose, valve body 26 is formed from at least one material in such a way that a quotient of a total weight of valve body 26 and a total volume of valve body 26 is less than a density of brake fluid or water (but greater than the density of air). This ensures, for example, that air may intentionally escape from check valve 12. In addition, a lift resulting from a difference between the quotient and the density of brake fluid contributes more strongly in the case of a float valve to valve body 26 being pressed against seal area 24 of valve seat 20, and check valve 12 is thus sealed more reliably. The design of valve body 26 as a float valve has no effects on a liquid flow flowing in the pressurized flow-through direction through check valve 12 past valve body 26. A recharging or suction behavior of check valves 12 is therefore not impaired by the design of valve body 26 as a float valve.

The advantageous quotient of the total weight of valve body 26 and the total volume of valve body 26 (less than the density of brake fluid) may be achieved, for example, in that valve body 26 is formed from a single material having a density less than the density of brake fluid. In the specific embodiment of FIG. 2, however, valve body 26 is implemented in 2-component technology. A valve area 40 of valve body 26, which has rounded side 28 oriented toward valve seat 20, is formed from a first material including a first mechanical resistance (and/or a first strength), while a remainder 42 of valve body 26 is formed from a second material including a second mechanical resistance less than the first mechanical resistance (and/or having a second strength less than the first strength). Primarily, for valve area 40 having rounded side 28 oriented toward valve seat 20, a low deformability is advantageous to implement the desired liquid-tight contact between valve area 40 and seal area 24 of valve seat 20. In contrast, a low deformability is not necessary for remainder 42 oriented away from valve seat 20. It is therefore advantageous to use the first material having the higher mechanical resistance (and thus also having the higher density) for valve area 40, while remainder 42 is formed from the second material having the lower mechanical resistance (and thus the lower density).

To additionally reduce the quotient of the total weight of valve body 26 and the total volume of valve body 26, valve body 26 of FIG. 2 completely encloses an inner cavity 44, which is filled with air, has a low pressure, and/or a vacuum, in an airtight manner. For example, remainder 42 has a recess, into which a projection formed on valve area 40 only partially protrudes, while an airtight contact exists between surfaces of valve area 40 and remainder 42 enclosing the recess and the projection. Valve area 40 may also have a recess into which a projection formed on remainder 42 (in the case of an airtight contact between surfaces of valve area 40 and remainder 42 enclosing the recess) only partially protrudes. The design of valve body 26 as a float valve may also be achieved cost-effectively with the aid of an air pocket, a low pressure pocket, or a vacuum pocket implemented in this manner.

Figure 3:
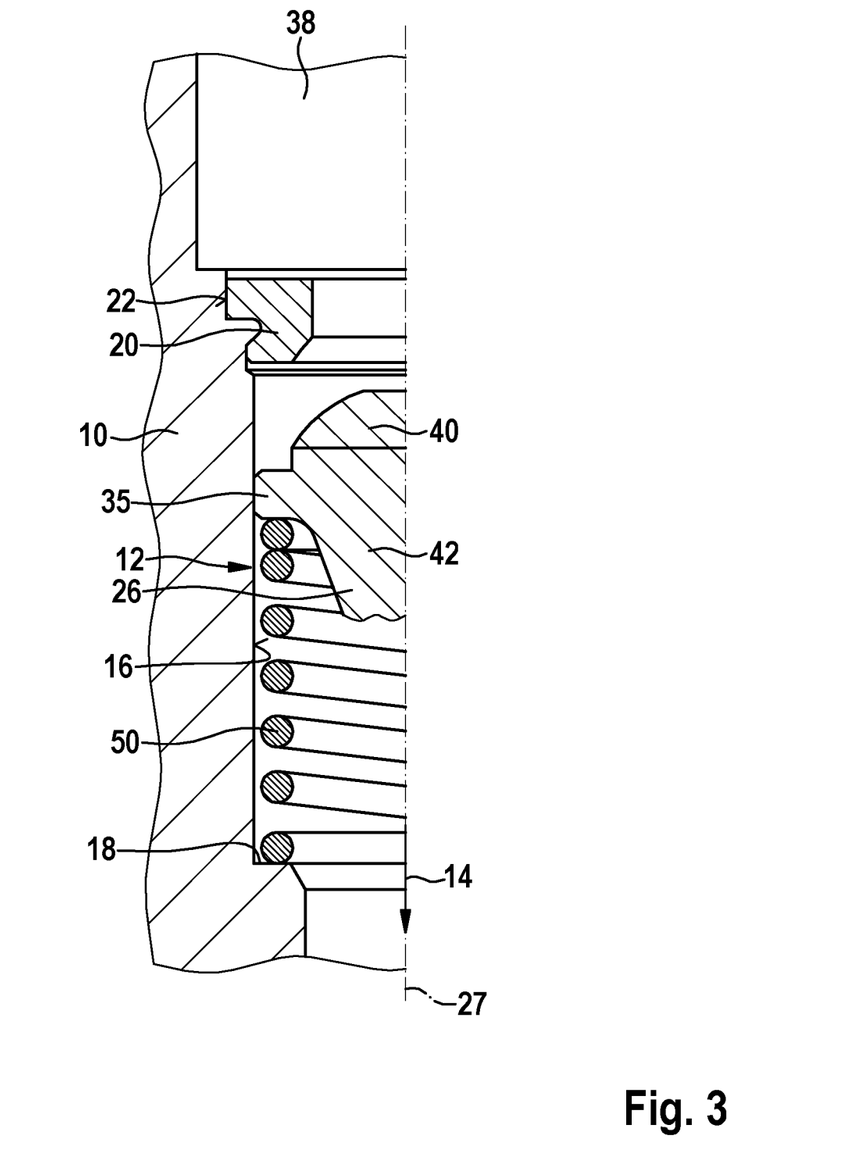
FIG. 3 shows a schematic partial view of a third specific embodiment of the hydraulic block.

FIG. 3 shows a schematic partial view of a third specific embodiment of the hydraulic block.

Hydraulic block 10 which is partially schematically shown in FIG. 3 also includes a valve body 26 manufactured in 2-component technology. In contrast to the above-described specific embodiments, check valve 12 provided in hydraulic block 10 also includes, in addition to valve seat 20 and valve body 26, a spring 50, which is anchored directly on valve body 26. The direct anchoring of spring 50 on valve body 26 improves a central guiding of valve body 26 inside check valve receiving bore 14 (in comparison to a spring-equipped check valve having a separation between valve body and spring) and thus contributes to suppressing turbulences as brake fluid flows through check valve 12 in its predefined flow-through direction. A support shoulder is formed on valve body 26 as a spring support of spring 50. Moreover, the lift limitation is ensured with the aid of the formed stop of valve body 26 at step 18. The stop may be formed both conically and as a (rectangular/stepped) shoulder.

All above-described hydraulic blocks 10 are usable in a variety of different braking systems for vehicles/motor vehicles. It is to be noted that a usability of hydraulic blocks 10 is not restricted to a special braking system type nor to a certain vehicle type/motor vehicle type.

Figure 4:
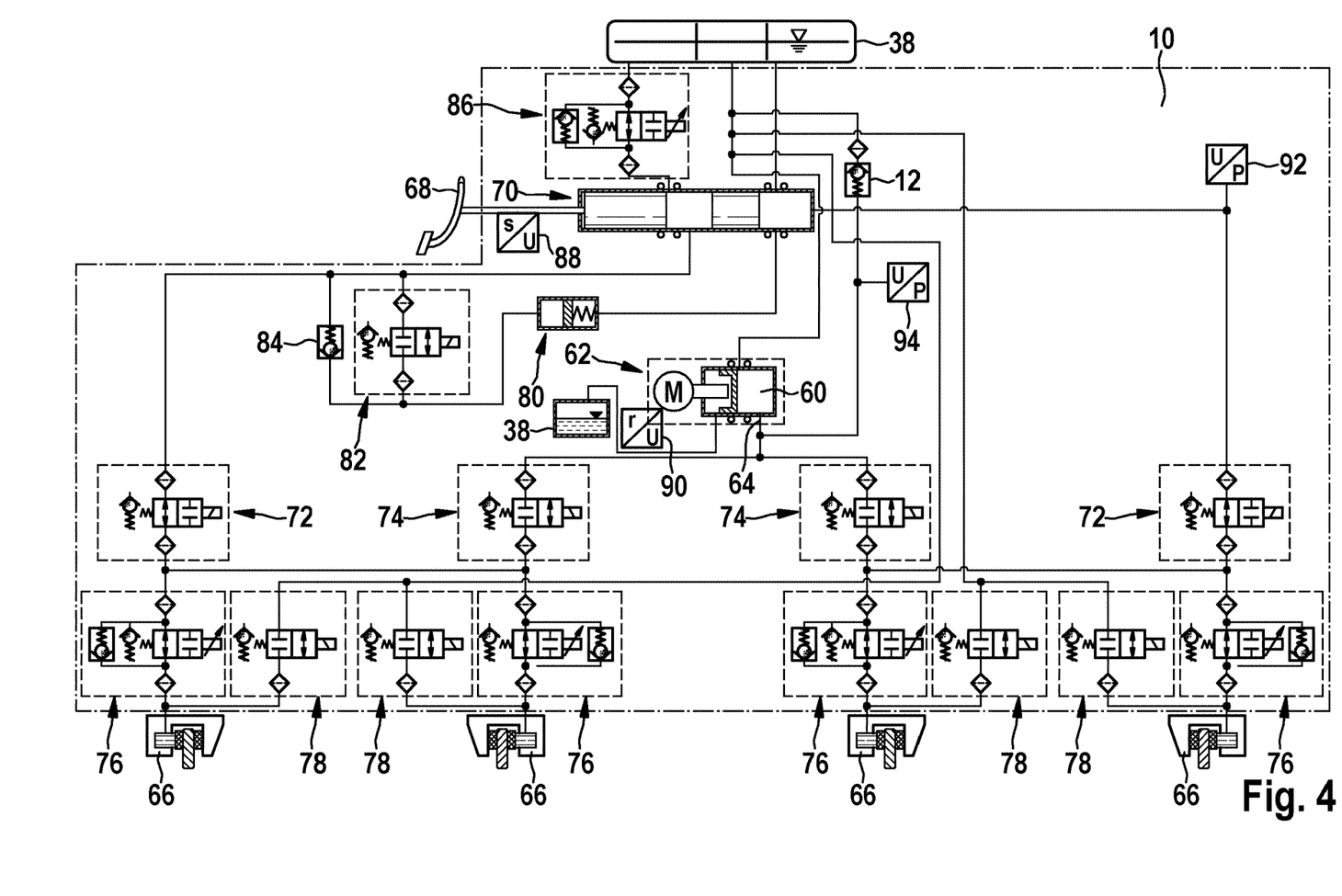
FIG. 4 shows a circuit diagram of one specific embodiment of the braking system.

FIG. 4 shows a circuit diagram of one specific embodiment of the braking system.

The braking system schematically shown in FIG. 4 is usable in a variety of different vehicles/motor vehicles. It is to be noted that a usability of the braking system is not limited to a certain vehicle type/motor vehicle type.

The braking system of FIG. 4 may be implemented with the aid of any of the above-described specific embodiments of hydraulic block 10. Check valve 12 may optionally be designed to be springless or to include spring 50. Valve body 26 of check valve 12 may also optionally be manufactured in one piece or in 2-component technology.

As a refinement, in hydraulic block 10 of the braking system, a plunger receiving bore 60 is formed, in which a motorized piston-cylinder device (or a plunger device) 62 is formed. Check valve receiving bore 14 is hydraulically connected to plunger receiving bore 60. For example, at least one line 64 may extend between check valve receiving bore 14 and plunger receiving bore 60 or check valve receiving bore 14 may open into plunger receiving bore 60. The advantages of check valve 12 may thus be used to increase or reduce at least one brake pressure in at least one wheel brake cylinder 66 of the braking system, which is connected to hydraulic block 10, with the aid of motorized piston-cylinder device 62. Therefore, the at least one brake pressure in the at least one wheel brake cylinder 66 may not only be increased with the aid of a driver brake force exerted on a brake pedal 68 of the braking system.

As optional refinements, hydraulic block 10 of FIG. 4 also includes a master brake cylinder 70, at least one first separating valve 72 for decoupling the at least one wheel brake cylinder 66 from master brake cylinder 70, at least one second separating valve 74 for decoupling the at least one wheel brake cylinder 66 from motorized piston-cylinder device 62, at least one wheel inlet valve 76 (having a check valve arranged in parallel in each case), and/or at least one wheel outlet valve 78. In addition, hydraulic block 10 includes a simulator 80, which is connected to master brake cylinder 70 via a simulator valve 82 and a further check valve 84 situated in parallel thereto. A snifting bore of master brake cylinder 70 is additionally connected via a reservoir separating valve 86 (having a check valve arranged in parallel) to brake fluid reservoir 38. Furthermore, at least one sensor, for example, a pedal travel sensor 88, a rotation rate sensor 90 (for a motor of motorized piston-cylinder device 62), a pilot pressure sensor 92, and/or a plunger pressure sensor 94 may also be inserted into hydraulic block 10.

The advantages of check valve 12 increase a usability of motorized piston-cylinder device 62 for increasing the at least one brake pressure in the at least one wheel brake cylinder 66: As a result of the advantageous lift limitation of check valve 12, it may close very rapidly in the event of a pressure buildup caused with the aid of motorized piston-cylinder device 62, so that no deceleration loss occurs during the increase of the at least one brake pressure in the at least one wheel brake cylinder 66. A comparatively short braking distance is thus ensured during brake application which is boosted or autonomously carried out with the aid of motorized piston-cylinder device 62.

It is moreover ensured as a result of the advantageous leak-tightness of the liquid-tight seal of check valve 12 that a leak at check valve 12 does not result in an erroneous intake of air in the braking system. An occurrence of undesirable air in the braking system of FIG. 4 is therefore easily detectable by pressure being built up via motorized piston-cylinder device 62. An impermissible elasticity of the braking system, which may be attributed to the occurrence of undesirable air, is therefore reliably detected by a balancing/comparison between values of rotation rate sensor 90 and plunger pressure sensor 94. Moreover, air may escape automatically via check valve 12 if check valve 12 is designed including a float valve as valve body 26.

Check valve 12 is also well suitable for subsequent snifting. If all the volume in plunger receiving bore 60 is consumed, although the driver or an automatic cruise control still requests a brake pressure increase, the motorized piston-cylinder device may thus snift/reload volume via check valve 12 from brake fluid reservoir 38 by retracting its piston. Valve body 26 is drawn away from valve seat 20 and enables a relatively large volume to flow from the brake fluid reservoir into plunger receiving bore 60 in a comparatively short time as a result of its flow-optimized shape. This volume may be used immediately for a further brake pressure buildup in the at least one wheel brake cylinder 66.

As a result of its flow-optimized design, check valve 12 may have comparatively large volume flows through it in the flow-through direction even at a relatively low temperature and/or a comparatively low atmospheric pressure (for example, at altitude). Even in the case of a low differential pressure (of nearly 0 bar) between a reservoir pressure and a plunger internal pressure, as naturally occurs at low temperatures or at a low atmospheric pressure, the good flow capability through check valve 12 is still ensured.

It is also to be noted that check valve 12 has good leak values and a high level of leak-tightness, even at a relatively high temperature. It is once again to be noted that no or only a very small volume loss occurs via check valve 12 during a pressure buildup. Check valve 12 provides all these advantages in spite of its cost-optimized design.

FIGS. 5a through 5f show schematic views of method steps of one specific embodiment of the manufacturing method for a hydraulic block for a braking system of a vehicle including at least one check valve.

The method described hereafter may be used to manufacture all above-described specific embodiments of hydraulic assemblies or the above-explained braking system. However, it is to be noted that an implementability of the method is not limited to a manufacture of a certain hydraulic block type or braking system type.

During carrying out the method (in a method step which is not shown) a check valve receiving bore 14 extending partially through hydraulic block 10 is formed, check valve receiving bore 14 being molded as a stepped recess into hydraulic block 10. For example, check valve receiving bore 14 is drilled/machined into hydraulic block 10 using a stepped tool. Check valve receiving bore 14 may also be impressed therein during a casting/injection-molding of hydraulic block 10.

Check valve receiving bore 14 is formed having a first subarea 14a having at least one minimum diameter and an inner second subarea 14b having at most a maximum diameter smaller than the minimum diameter. A transition between first subarea 14a and second subarea 14b is preferably formed as a (rotation-symmetrical) step 18. In this flow-optimized design of check valve receiving bore 14, no/marginal turbulences arise as brake fluid flows through subsequent check valve 12. As also stated above, (rotation-symmetrical) step 18 may be used for the lift limitation of subsequent check valve 12.

Figure 5A:
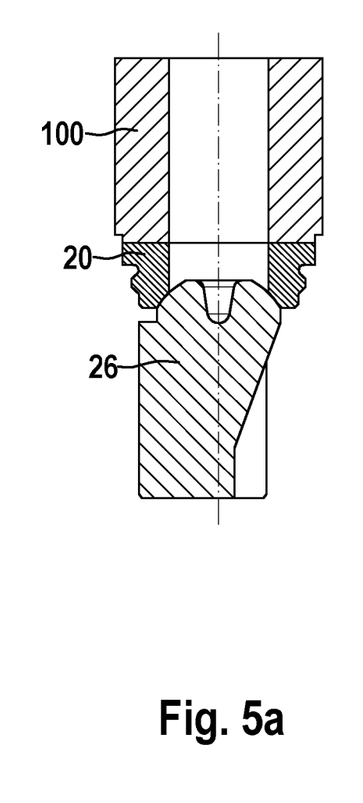
FIGS. 5a through 5f show schematic views of method steps of one specific embodiment of the manufacturing method for a hydraulic block for a braking system of a vehicle including at least one check valve.

Subsequent check valve 12 is equipped with a valve body 26 and a valve seat 20 (see FIG. 5a). In the specific embodiment of FIGS. 5a through 5f, this takes place by valve body 26 being suctioned with the aid of a stamp 100 (via low pressure) against valve seat 20. At the same time, a leak-tightness of a contact between valve body 26 and valve seat 20 may be checked. If a liquid-tight contact is present between valve body 26 and a seal area 24 of valve seat 20 as valve body 26 is suctioned against valve seat 20, valve body 26 has a secure hold on stamp 100 and may therefore be transported with the aid of the low pressure (in spite of a weight force of valve body 26) to hydraulic block 10 to be equipped therewith. If sufficient leak-tightness is not present between valve body 26 and valve seat 20, valve body 26 thus falls off at least during the transportation (in spite of the applied low pressure).

Checking of valve body 26 and valve seat 20 is therefore already possible during the installation. In this way, it may be detected early whether a flaw impairing the desired leak-tightness of subsequent check valve 12 is present on valve body 26 or on valve seat 20, and the method may be terminated if necessary before carrying out unnecessary method steps.

Figure 5B:
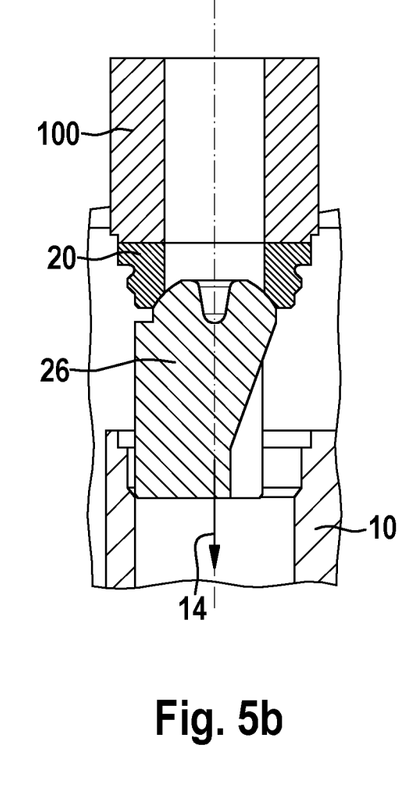

FIG. 5b shows an introduction/threading of valve body 26 into check valve receiving bore 14. Valve body 26 is adjustably situated inside at least first subarea 14a of check valve receiving bore 14, penetration/falling of valve body 26 into second subarea 14b of check valve receiving bore 14 (due to the maximum diameter being smaller than an extension of valve body 26) being prevented with the aid of the conical lift limitation.

Figure 5C:
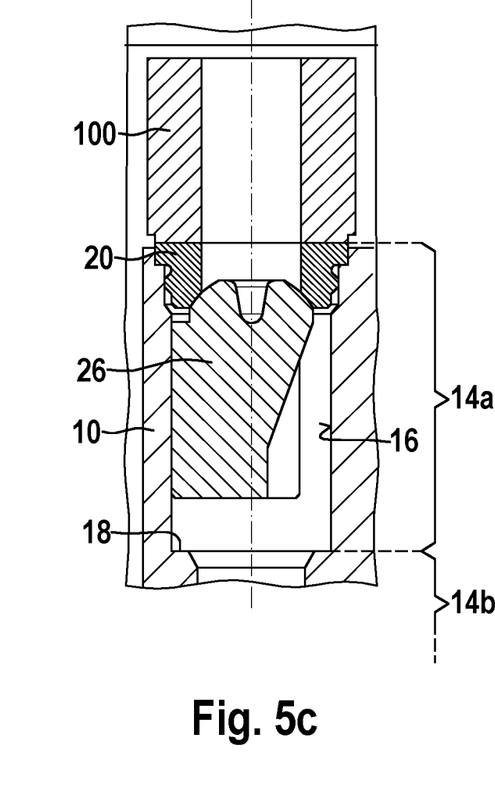

Valve seat 20 is also at least partially guided into check valve receiving bore 14, as shown in FIG. 5c. Valve seat 20 is thereafter fastened in such a way that valve seat 20 protrudes at least partially into check valve receiving bore 14 (see FIG. 5d). For example, valve seat 20 is pressed into at least one material of hydraulic block 10 in such a way that a liquid-tight contact exists between valve seat 20 and hydraulic block 10. The fastening of valve seat 20 on hydraulic block 10 may also be described as seal grouting. The at least one material of hydraulic block 10 may be deformed at the same time. In particular valve seat 20 may be guided via the at least one material of hydraulic block 10.

Figure 5D:
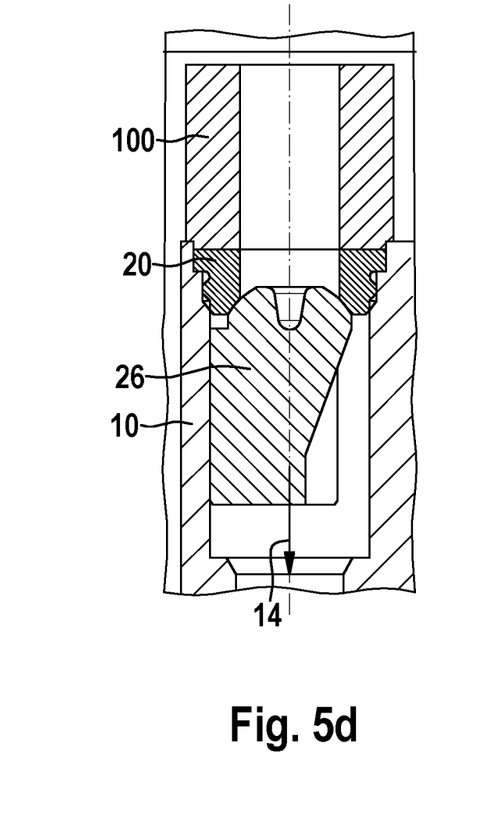

In the method step shown in FIG. 5d, it is also ensured as a result of the provided leak-tightness between valve seat 20 and hydraulic block 10 that subsequent check valve 12 is sealed (liquid-tight) with the aid of a (liquid-tight) contact between valve body 26 and valve seat 20. Valve seat 20 is inserted onto and/or into check valve receiving bore 14 in direct contact with at least one inner wall 16 of check valve receiving bore 14.

Figure 5E:
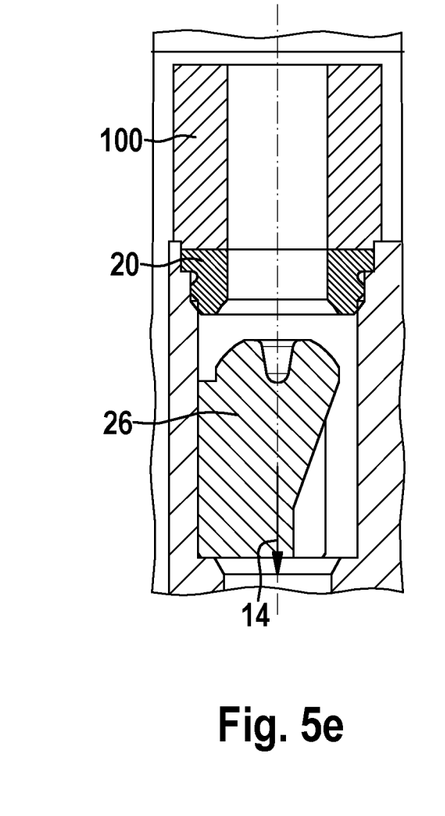

Subsequently, with further use of stamp 100, a flow rate measurement may be carried out, as schematically shown in FIG. 5e. A further leak-tightness measurement may also be carried out via low pressure.

Figure 5F:
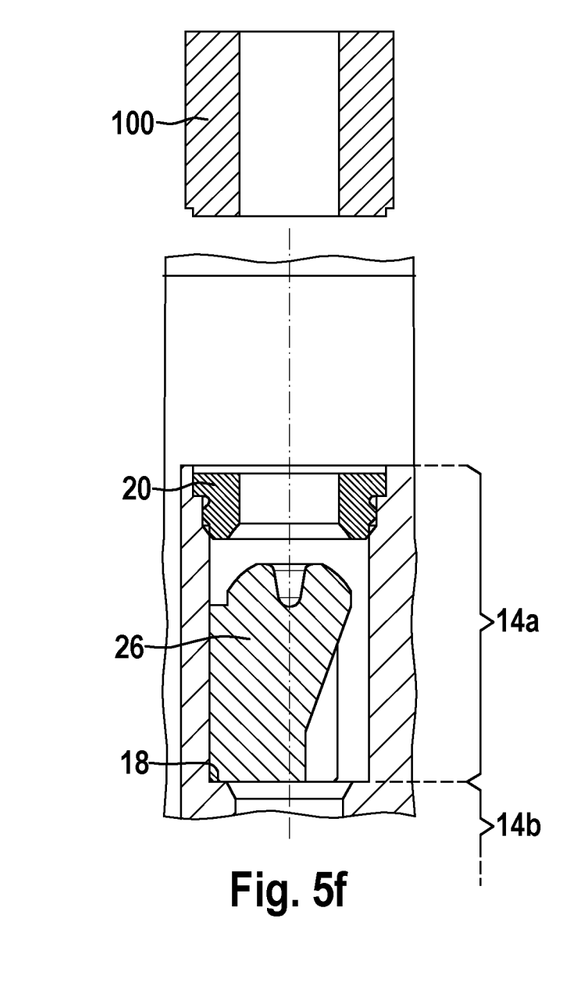

FIG. 5f shows check valve 12 after ending of the method described here. It is apparent that valve body 26 is adjustably inserted within first subarea 14a of check valve receiving bore 14 without a cage. The method described here thus also provides the advantages listed above.

What is claimed is:

1. A hydraulic block for a braking system of a vehicle, comprising:
at least one check valve situated in a check valve receiving bore extending partially through the hydraulic block, the at least one check valve including a permanently situated valve seat protruding at least partially into the check valve receiving bore, and a valve body adjustable within at least a first subarea of the check valve receiving bore,
wherein:
the check valve is sealable with the aid of a contact between the valve body and the valve seat,
the check valve receiving bore is formed as a stepped recess in the hydraulic block,
the first subarea has at least one minimum diameter,
an inner second subarea of the check valve receiving bore includes at most a maximum diameter smaller than the minimum diameter,
the valve seat is inserted at least one of onto and into the check valve receiving bore in direct contact with at least one inner wall of the check valve receiving bore, and
the valve body is situated cageless and adjustable within the first subarea of the check valve receiving bore,
wherein the valve body is rotationally symmetrical, the valve body including: (i) a rounded end with a convex profile oriented toward the valve seat, and (ii) an intermediate or end portion, the intermediate or end portion being tapered and being in the form of a cone or a truncated cone; and
wherein the valve body includes guide projections that protrude into guide tracks in the at least one inner wall of the check valve receiving bore, wherein the guide projections are formed on a side of the valve body facing away from the valve seat.

2. The hydraulic block as recited in claim 1, wherein:
a valve area of the valve body including the rounded end oriented toward the valve seat is formed from a first material having a first mechanical resistance, and
a remainder of the valve body is formed from a second material having a second mechanical resistance less than the first mechanical resistance.

3. The hydraulic block as recited in claim 1, wherein:
the check valve receiving bore is formed on a reservoir side of the hydraulic block, and
a brake fluid reservoir is one of installable and installed on the reservoir side.

4. The hydraulic block as recited in claim 3, wherein:
a plunger receiving bore is formed in the hydraulic block, and
the check valve receiving bore is hydraulically connected to the plunger receiving bore.

5. The hydraulic block as recited in claim 1, wherein the check valve is springless.

6. The hydraulic block as recited in claim 5, wherein a quotient of a total weight of the valve body and a total volume of the valve body is less than a density of one of a brake fluid and water.

7. The hydraulic block as recited in claim 6, wherein the valve body encloses completely and in a liquid-tight manner an inner cavity that is filled with air and one of has a low pressure and has a vacuum.

8. The hydraulic block as recited in claim 1, wherein a spring of the check valve is anchored directly on the valve body.

9. The hydraulic block as recited in claim 1, wherein:
the valve seat has a cutting edge, and
at least one material of the hydraulic block is softer than at least one material of the valve seat and is reshaped due to a contact with the cutting edge of the valve seat.

10. A braking system for a vehicle, comprising:
a brake fluid reservoir; and
a hydraulic block for a braking system of a vehicle, the brake fluid reservoir installed on the hydraulic block, the hydraulic block including:
   at least one check valve situated in a check valve receiving bore extending partially through the hydraulic block, the at least one check valve configured to control a brake fluid transfer between the brake fluid reservoir and the braking system, the at least one check valve including a permanently situated valve seat protruding at least partially into the check valve receiving bore, and a valve body adjustable within at least a first subarea of the check valve receiving bore,
wherein:
   the check valve is sealable with the aid of a contact between the valve body and the valve seat,
   the check valve receiving bore is formed as a stepped recess in the hydraulic block,
   the first subarea has at least one minimum diameter,
   an inner second subarea of the check valve receiving bore includes at most a maximum diameter smaller than the minimum diameter,
   the valve seat is inserted at least one of onto and into the check valve receiving bore in direct contact with at least one inner wall of the check valve receiving bore, and
   the valve body is situated cageless and adjustable within the first subarea of the check valve receiving bore,
wherein the valve body is rotationally symmetrical, the valve body including: (i) a rounded end with a convex profile oriented toward the valve seat, and (ii) an intermediate or end portion, the intermediate or end portion being tapered and being in the form of a cone or a truncated cone; and
wherein the valve body includes guide projections that protrude into guide tracks in the at least one inner wall of the check valve receiving bore, wherein the guide projections are formed on a side of the valve body facing away from the valve seat.

11. A manufacturing method for a hydraulic block for a braking system of a vehicle including at least one check valve, comprising:
   forming a check valve receiving bore extending partially through the hydraulic block;
   introducing a valve body of the check valve into the check valve receiving bore in such a way that the valve body is adjustable within at least a first subarea of the check valve receiving bore; and
   fastening a valve seat of the check valve in such a way that the valve seat protrudes at least partially into the check valve receiving bore and the check valve is sealed with the aid of a contact between the valve body and the valve seat,
wherein:
   the check valve receiving bore is formed as a stepped recess in the hydraulic block,
   the first subarea has at least one minimum diameter,
   an inner second subarea of the check valve receiving bore includes at most a maximum diameter smaller than the minimum diameter,
   the valve seat is inserted at least one of onto and into the check valve receiving bore in direct contact with at least one inner wall of the check valve receiving bore, and
   the valve body is situated cageless and adjustable within the first subarea of the check valve receiving bore,
wherein the valve body is rotationally symmetrical, the valve body including: (i) a rounded end with a convex profile oriented toward the valve seat, and (ii) an intermediate or end portion, the intermediate or end portion being tapered and being in the form of a cone or a truncated cone; and
wherein the valve body includes guide projections that protrude into guide tracks in the at least one inner wall of the check valve receiving bore, wherein the guide projections are formed on a side of the valve body facing away from the valve seat.

12. A manufacturing method for a hydraulic block for a braking system of a vehicle including at least one check valve, comprising:
   forming a check valve receiving bore extending partially through the hydraulic block;
   introducing a valve body of the check valve into the check valve receiving bore in such a way that the valve body is adjustable within at least a first subarea of the check valve receiving bore; and
   fastening a valve seat of the check valve in such a way that the valve seat protrudes at least partially into the check valve receiving bore and the check valve is sealed with the aid of a contact between the valve body and the valve seat,
wherein:
   the check valve receiving bore is formed as a stepped recess in the hydraulic block,
   the first subarea has at least one minimum diameter,
   an inner second subarea of the check valve receiving bore includes at most a maximum diameter smaller than the minimum diameter,
   the valve seat is inserted at least one of onto and into the check valve receiving bore in direct contact with at least one inner wall of the check valve receiving bore, and
   the valve body is situated cageless and adjustable within the first subarea of the check valve receiving bore, and
wherein the method further comprises:
   suctioning the valve body with the aid of a stamp onto the valve seat before introduction of the valve body and the fastening of the valve seat; and
   simultaneous with the suctioning, checking a leaktightness of a contact between the valve body and the valve seat.

* * * * *